United States Patent [19]

Graves

[11] Patent Number: 4,673,944
[45] Date of Patent: Jun. 16, 1987

[54] AUTOCALIBRATING INTERFEROMETER

[75] Inventor: Ross E. Graves, Santa Fe, N. Mex.

[73] Assignee: Hughes Aircraft Company, Los Angeles, Calif.

[21] Appl. No.: 588,600

[22] Filed: Mar. 12, 1984

[51] Int. Cl.$^4$ ................................................ G01S 5/02
[52] U.S. Cl. ...................................... 342/424; 342/425
[58] Field of Search .................................. 343/424, 425

[56] References Cited

U.S. PATENT DOCUMENTS

| | | | |
|---|---|---|---|
| 3,886,555 | 5/1975 | Royal | 343/425 |
| 3,900,879 | 8/1975 | Lewinter | 343/424 |
| 3,922,533 | 11/1975 | Royal | 343/442 |
| 3,935,574 | 1/1976 | Pentheroudakis | 343/424 |
| 4,494,118 | 1/1985 | Graves | 343/424 |
| 4,509,052 | 4/1985 | Cash | 343/424 X |
| 4,532,515 | 7/1985 | Cantrell et al. | 343/424 X |

*Primary Examiner*—Theodore M. Blum
*Assistant Examiner*—John B. Sotomayor
*Attorney, Agent, or Firm*—J. A. Sawyer, Jr.; M. J. Meltzer; A. W. Karambelas

[57] ABSTRACT

A direction-finding interferometer (100) includes a novel autocalibration subsystem using bi-directional transmissions at a common frequency. The interferometer determines direction using a primary phase comparator (15) to assess the phase differences in signals transmitted by signal channels (13) from multiple antennas (11). The signal channels may include RF amplifiers (17), mixers (19) coupled to a local oscillator (23), IF amplifiers (21), and transmission lines.

The autocalibration subsystem employs a frequency synthesizer (25) as a calibration signal source. The calibration signal path is directed between reversing switches (40) and couplers (33) in alternating directions via transmission lines (57 and 59). In either direction, the calibration is split so that part of the signals are coupled into the signal channels, and the remaining part is directed to a secondary phase comparator (131). The outputs of the primary and secondary comparators provide the data necessary for autocalibration.

Other embodiments provide for a secondary comparator operating at a frequency range similar to that of the primary comparator. Gain autocalibration is also described.

12 Claims, 3 Drawing Figures

AUTOCALIBRATING INTERFEROMETER

BACKGROUND OF THE INVENTION

The present invention relates to direction-finding interferometers, and, more particularly, to autocalibration systems for such interferometers. The invention has application to both phase and gain autocalibration.

Direction-finding interferometers determine direction by ascertaining phase differences in signals received by multiple antennas. In such a system, signals from several antennas are connected to a central location by signal channels, including active components and transmission lines. Any phase differences introduced by signal channels must be precisely compensated or accounted for to maintain system accuracy. In interferometers employing sum signals, used for example to improve signal-to-noise ratios, gain differences also should be compensated to optimize performance of the detection and signal processing circuitry following the formation of the sum signal.

Temporal variations in electrical length (i.e., phase shift) may differ between signal channels due to varying temperature gradients, different reactions to temperature and other environmental factors on the respective signal channels, and equipment aging. These variations are aggravated in long-baseline interferometers in which the antenna elements are spaced far apart so that environmental variations between paths are greater and electrical lengths are more difficult to control.

More specifically, many interferometers employ radio-frequency (RF) preamplifiers between the respective antenna feeds and the central processing location. Generally, the temperatures of these preamplifiers are not closely controlled. Also, the components of the preamplifiers are subject to drift and aging.

Additionally, the signals in the varying paths are usually translated by mixers, amplified by subsequent independent microwave and intermediate frequency (IF) amplifiers, and switched prior to phase and/or gain comparison. All these processes are potential sources of differential errors which can have deleterious effects on interferometer accuracy if left uncompensated.

In order to compensate precisely for variations in electrical length, calibration is necessary. Occasional recalibration is required to correct for temporal variations. An external beacon of known direction may be used for periodic recalibration of the direction-finding interferometer.

For external calibration to be effective, the beacon source must be "in view" and in a known position and orientation relative to the interferometer. Thus external calibration requires independent position location and orientation determination. Furthermore, external calibration can only occur when the interferometer is in the vicinity of a calibration beacon, and there is no significant interference with the calibration beacon. As a result, external calibration is not very suitable for frequent calibration. Hence, there is relatively great opportunity for systematic errors in direction-finding interferometers to develop between external calibrations.

Various internal calibration systems have been developed. Generally, these are used in conjunction with occasional external recalibration so that phase and gain differences introduced by factors, such as thermal distortion of the antenna, other than electrical length may be compensated. However, most internal calibration systems are dependent on known relative electrical lengths, and so are subject to the same temporal errors as the interferometer system.

M. Mollet et al., "Advanced VHF Interferometer Spacecraft Tracking System," *Electrical Communication*, Vol. 49, No. 3, 1974, discloses a system for reducing errors due to the uncertainty of the electrical lengths of the transmission lines. Bi-directional transmission of two calibration signals at different frequencies through the system is used to determine the electrical lengths of the transmission lines. However, precise calibration is impaired by indeterminable frequency-related phase shifts through the different network paths.

What is needed is an improved autocalibration subsystem for a direction-finding interferometer, which provides for frequent recalibration without requiring bi-directional transmission of calibration signals at different frequencies. The autocalibration should be effective despite different temporal variations in the electrical lengths of the various signal channels. Furthermore, compatibility with external calibration systems is desired.

SUMMARY OF THE INVENTION

In accordance with the present invention, an autocalibration subsystem, including alternating symmetrical signal paths for a calibration signal, provides for internal calibration of a direction-finding interferometer. The subsystem applies to calibration according to a predetermined signal characteristic —e.g. phase or amplitude.

The autocalibration subsystem is incorporated in a direction-finding interferometer having two or more antenna elements. Each antenna element has a respective channel for directing, usually with processing, the antenna output to a primary comparator for a predetermined signal characteristic. Normally, each channel includes signal processing components, such as an RF preamplifier, a mixer connected to a common local oscillator, and an IF amplifier, and transmission lines.

Typically, the predetermined signal characteristic is phase for the direction-finding interferometer, and the comparator is used primarily to assess signal source direction as a function of phase differences in the outputs of the antenna elements. In systems where plural signals are added to improve signal-to-noise ratios, an amplitude comparator is included to provide gain calibration.

The autocalibration subsystem includes reversing switches associated with respective signal channels. Each reversing switch includes an input port connected to a signal source, which may be a calibration frequency synthesizer. Each reversing switch includes an output port connected to a comparator for comparing signals received, directly or indirectly, from different reversing switches, according to the predetermined signal characteristic.

Each reversing switch also includes third and fourth bi-directional ports, each of which serves as an input port while the other serves as an output port. Each bi-directional port is electrically connected to the other and to the respective channel by a coupler and transmission lines.

A switch controller, or other controller means, operates to reverse the bi-directional ports of at least two reversing switches concurrently and periodically. In either switching condition, the calibration signal is directed along two paths. One path includes a transmission line from the switch to the respective coupler, the respective channel and the primary comparator. The primary comparator determines discrepancies between channels, as a first approximation.

The other path includes the transmission line of the first path between the switch and coupler, the other transmission line between the coupler and the switch, and one or more transmission lines between the output port of the switch and the secondary comparator. The secondary comparator permits the output of the primary comparator to be corrected for systematic discrepancies introduced by the autocalibration subsystem itself.

In accordance with one realization of the invention, provision is made to transform the signal outputs of the reversing switches before comparison. This may be done, for example, with respect to frequency in a phase autocalibration system so that the primary and secondary comparators can have similar operating ranges. Provision for replacing the signals from the reversing switches with a common signal is made to assess relative shifts in the predetermined signal characteristic introduced by the transform means.

Alternatively, the same transform objective is obtained according to another realization of the present invention in which respective reversing switch outputs are alternately directed to respective and anti-respective transform means. By taking the average of the difference of the two readings of the secondary comparator, the differing effects of the respective transform means are cancelled. The alternating may be accomplished by means of an additional reversing switch. The additional reversing switch has the main reversing switch outputs as inputs; the outputs of the additional reversing switch are directed to the respective transform means. A switch controller provides for the two switch conditions.

In accordance with the foregoing, a subsystem providing for frequent calibration of a direction-finding interferometer is presented. The calibrated signal characteristic to be calibrated may be phase, and/or gain. Preferably, the autocalibration subsystem would be supplemented by occasional external calibration.

This invention advantageously provides a means for interferometer calibration without use of an external signal source in such a way that the resulting differential phase and gain calibration data are unaffected by phase shifts and insertion loss (or gain) variations introduced in the circuits employed to couple calibration signals into the system. The fact that an aerospace system can be calibrated frequently without use of an Earth-based calibration source is of great importance for achieving the best possible performance when the calibration ground station is out of view. The autocalibration means is also applicable to surface and aircraft interferometer installations as it permits frequent recalibration without requiring the use of airborne beacons and similar external calibration means and associated instrumentation.

DESCRIPTION OF THE PREFERRED EMBODIMENTS

Figure 1:
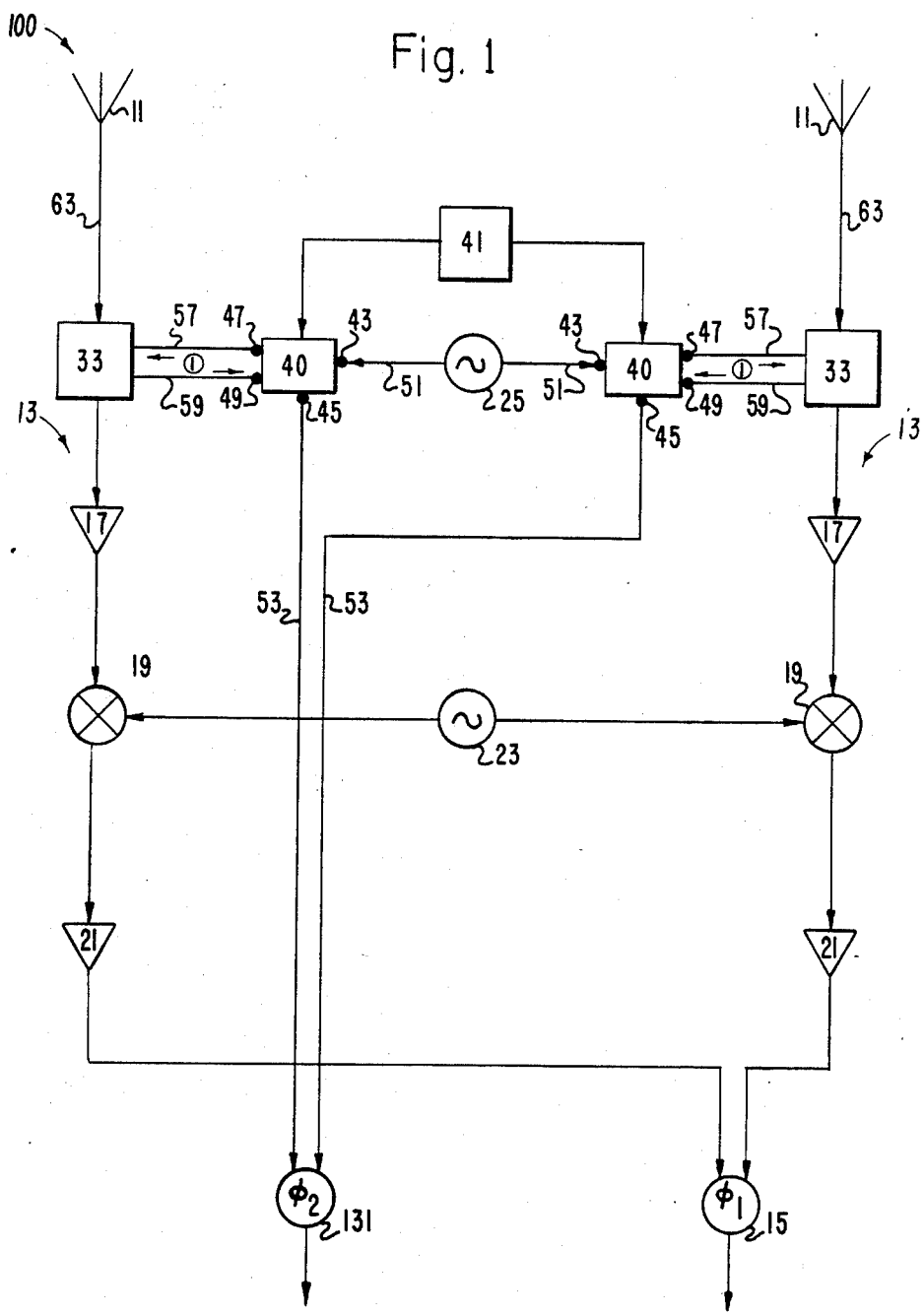
FIG. 1 is a direction-finding interferometer with a phase autocalibration subsystem in accordance with the present invention.
Figure 2:
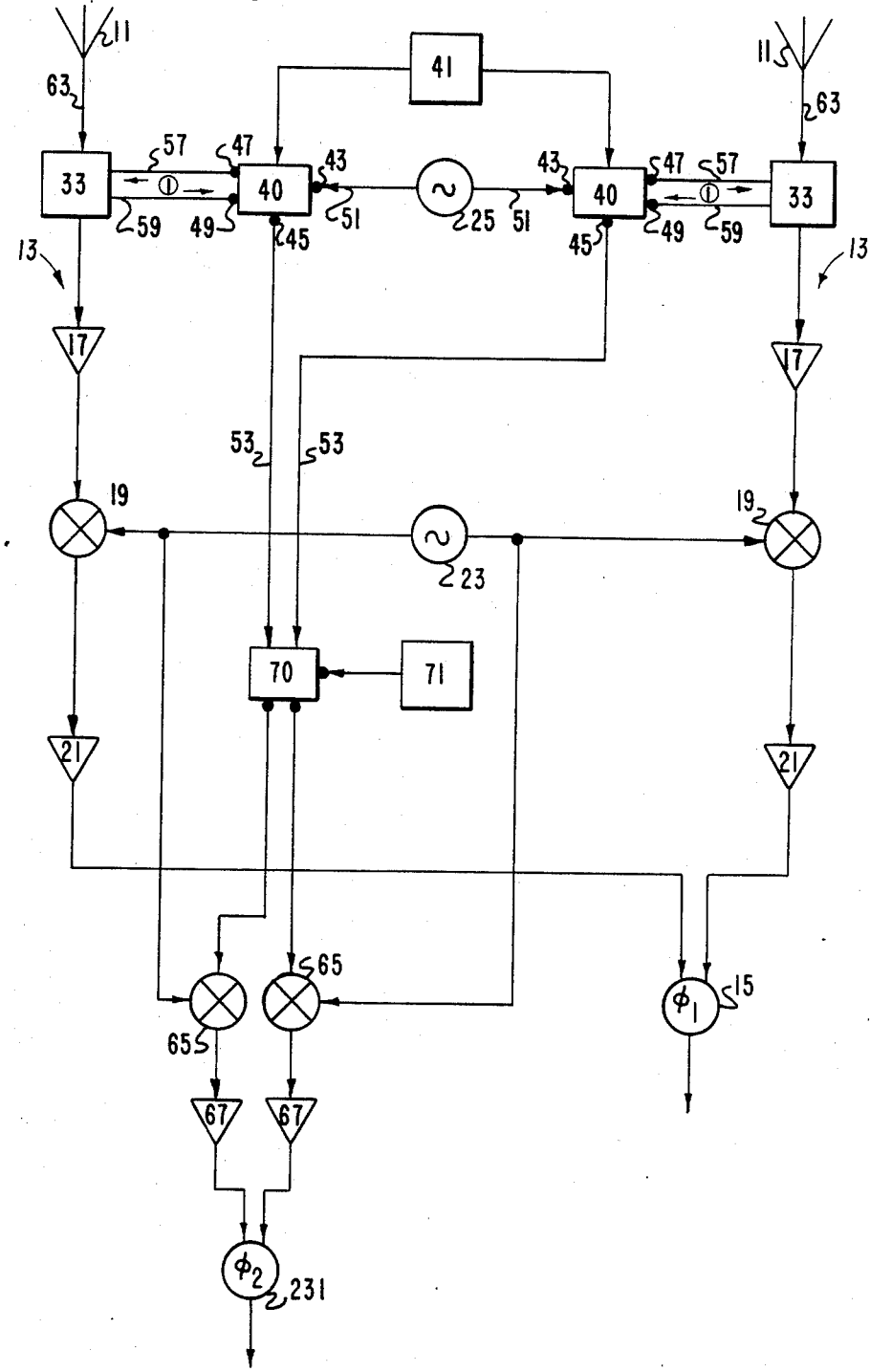
FIG. 2 is a direction-finding interferometer with a phase autocalibration subsystem in which a secondary phase comparator operates at an intermediate frequency in accordance with the present invention.
Figure 3:
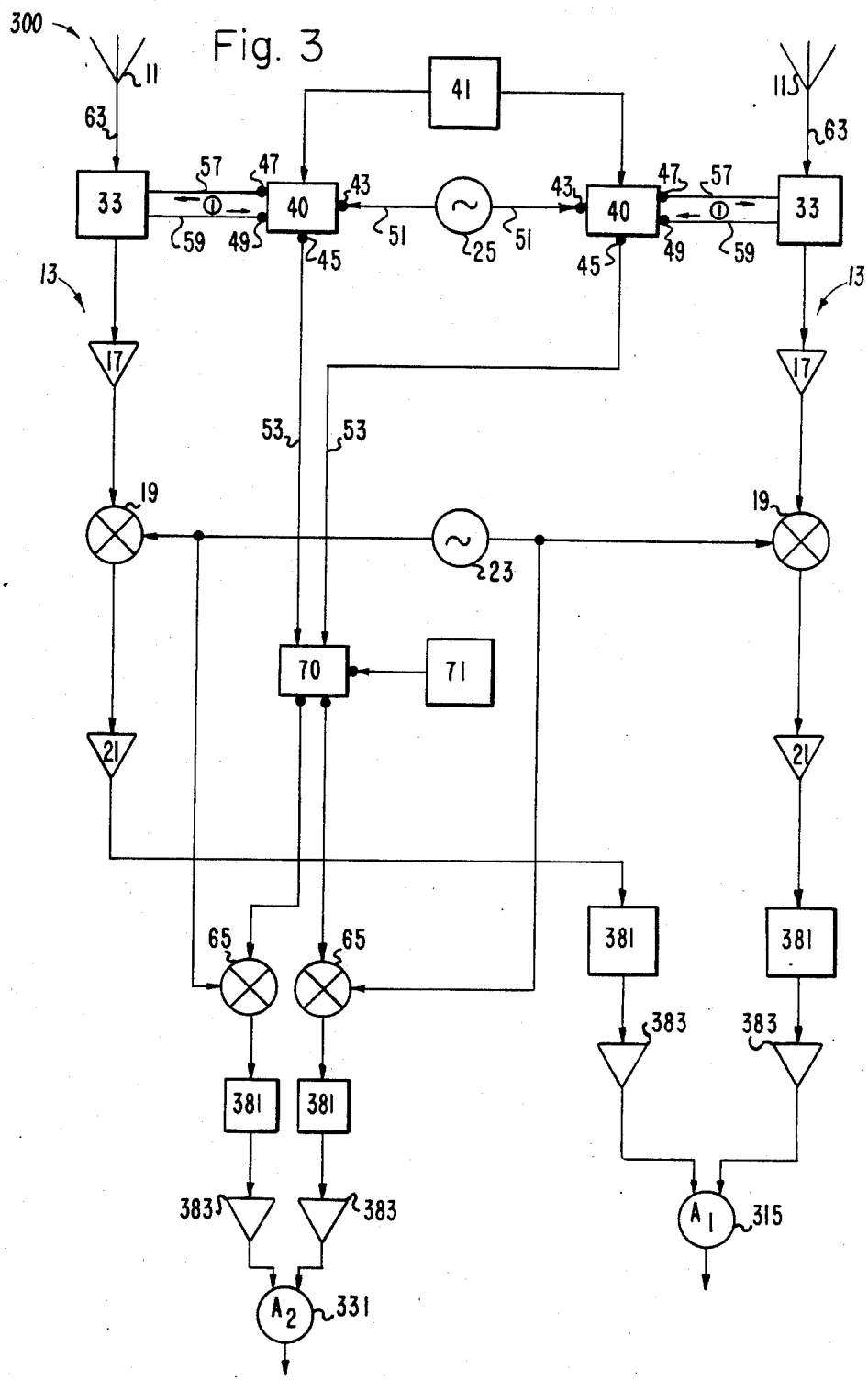
FIG. 3 is a direction-finding interferometer with a gain autocalibration subsystem in accordance with the present invention.

Three direction-finding interferometers 100, 200 and 300 are presented herein and illustrated in FIGS. 1, 2 and 3. Each interferometer includes plural antennas 11 and associated signal channels 13 for transmitting antenna signals to a primary comparator 15, 315. The signal channels 13 include active components, such as RF preamplifiers 17, mixers 19 and IF amplifiers 21. A common local oscillator 23 is connected to each of the mixers 19.

In accordance with the present invention, each interferometer 100, 200, 300 includes an autocalibration subsystem including a frequency synthesizer 25 or other calibration signal source, respective reversing switches 40, a switch controller 41 and a secondary comparator 131, 231, 331. The frequency synthesizer 25, preferably, is variable over the frequency reception range of the interferometer so that calibration can be effected as a function of frequency. RF couplers 33 are provided to couple the autocalibration subsystem into the signal channels 13.

The autocalibration subsystems for the first two interferometers 100, 200 are directed to phase autocalibration, and the included comparators 15, 131 and 231 are phase comparators. In practice, primary phase comparator 15 would be the same phase comparator used for the normal interferometer measurement. The autocalibration subsystem for the third interferometer 300 is directed toward gain autocalibration and the incorporated comparators 315 and 331 are amplitude comparators such as differential amplifiers.

The first and second interferometers 100 and 200 differ essentially in the operating frequency of their secondary comparators 131 and 231, respectively. In the first embodiment, the secondary comparator 131 operates at the synthesizer frequency, which is RF. The secondary phase comparator 231 in the second interferometer 200 operates at a convenient intermediate frequency, as does the primary comparator 15 in both first and second interferometers 100 and 200.

In the autocalibration subsystem for each of the three interferometers 100, 200 and 300, each respective reversing switch 40 includes four terminals or ports, an input port 43, an output port 45, a third port 47 and a fourth port 49, the latter two being used bi-directionally. Each input port 43 is connected, via a transmission line 51, to the frequency synthesizer 25. The output of frequency synthesizer 25 lies within the antenna frequency range. Each output port 45 is connected, via a transmission line 53, to the secondary comparator 131, 231, 331, directly or indirectly. The third and fourth ports 47 and 49 are electrically connected to each other and the respective signal channel 13 via the coupler 33 and transmission lines 57 and 59.

The switch controller 41 alternates between first and second reversing switch conditions. In the first condition, each reversing switch 40 receives the output of the frequency synthesizer 25 at its input port 43 and directs the calibration signal to its bi-directional third port 47. The calibration signal is directed to the RF coupler 33 via transmission line 57.

The calibration signal is divided at the RF coupler 33 into two components. One component of the calibration signal is coupled to the respective signal channel 13 associated with the respective antenna 11. The other calibration signal component returns to the reversing switch 40 at its bi-directional fourth port 49 via transmission line 59, as indicated by the circles "1" and the arrows in FIGS. 1, 2 and 3. The reversing switch 40 directs this component to its output port 45 for eventual direction along transmission lines to the secondary comparator 131, 231, 331. The operation in the second switch condition is identical, except that the roles of the bi-directional third and fourth ports 47 and 49 are reversed, as are the roles of the transmission lines 57 and 59.

The RF couplers 33 are located at the antennas 11 to minimize any differential phase errors due to changes in the electrical lengths of the transmission lines 63 between the antennas 11 and the couplers 33. The coupling between the transmission lines 57 and 59 from the reversing switches 40 and the transmission lines 63 from the antennas 11 is −20 dB or less to minimize the degradation in the system noise figure and the attenuation of the received signals caused by insertion of the couplers prior to the RF preamplifiers 17.

To achieve the accuracy potential of the autocalibration system, the differential phase shifts in the RF couplers 33 and in the reversing switches 40 must either be known and stable, or these phase shifts must track with sufficient accuracy between transmission channels 13. These phase shifts would be relatively easy to stabilize to a high accuracy and, in the case of a satellite system, they may be measured either prior to launch or in the course of the external on-orbit calibration, so that they may be regarded as known functions of frequency and due account taken of them. Analogous comments apply to an airborne system.

The essential operations of the three autocalibration subsystems incorporated in interferometers 100, 200 and 300 are similar and are here explained with reference to the first interferometer 100 and FIG. 1. In the following analysis it is assumed that the differential contribution to the effects of the couplers 33 and the transmission lines 63 serving as inputs to the couplers 33 are negligible. It is further assumed that the differential effects of the transmission lines from the output ports 45 of the reversing switches 40 are stable and known, e.g. through external calibration. By proper layout, and selection of couplers, these criteria can be met. For example, the transmission lines to the couplers and from the output ports of the reversing switches can be made short enough so that the differences in their contributions to phase are negligible.

In the first switch condition, the inputs to the secondary comparator 131 reflect, aside from known or negligible phase delays, the phase delays $B_L+C_L$ and $B_R+C_R$ introduced by each pair of transmission lines 57 and 59. Here $B_L$ and $B_R$ are the phase delays introduced by the left and right transmission lines 57, and $C_L$ and $C_R$ similarly represent the phase delays for the left and right transmission lines 59.

The output of the secondary comparator 131 in the first switch position is given by:

$$\phi_{21}=(B_L+C_L)-(B_R+C_R) \qquad (\text{mod } 2\pi).$$

where $\phi_{ij}$ is taken at the $i^{th}$ comparator with the reversing switches 40 in the $j^{th}$ condition.

Analogously, the output of the secondary comparator 131 in the second switch condition is, aside from known phase delays:

$$\phi_{22}=(C_L+B_L)-(C_R+B_R) \qquad (\text{mod } 2\pi).$$

which is equivalent to $\phi_{12}$.

Likewise the output of the primary comparator 15 in the first switch condition is, aside from known phase delays:

$$\phi_{11}=(B_L+A_L)-(B_R+A_R) \qquad (\text{mod } 2\pi).$$

where $A_L$ and $A_R$ represent the phase delays in the respective left and right signal channels between the couplers 33 and the primary comparator 15.

The output of the primary comparator 15 in the second switch condition is, aside from known phase delays:

$$\phi_{12}=(C_L+A_L)-(C_R+A_R) \qquad (\text{mod } 2\pi).$$

Algebraic manipulation of last two equation yields:

$$2(A_L-A_R)=\phi_{11}+\phi_{12}-[(B_L+C_L)-(B_R+C_R)] \qquad (\text{mod } 2\pi).$$

Using the first equation, this last equation assumes the form:

$$2(A_L-A_R)=\phi_{11}+\phi_{12}-\phi_{21}. \qquad (\text{mod } 2\pi).$$

Thus the differential phase delay $(A_L-A_R)$ between the two signal channels is determined modulo $\pi$ from the outputs of the two comparators.

Since the phase comparators measure phase differences modulo $2\pi$, rather than unambiguously, the quantity $2(A_L-A_R)$ is determined only to within an integral multiple of $2\pi$ radians by the measured values of $\phi_{11}$, $\phi_{12}$ and $\phi_{21}$: hence the differential phase $(A_L-A_R)$ is determined only to within a multiple of $\pi$ radians. Note that, in any event, the value of $(A_L-A_R)$ is of concern only to within a multiple of $2\pi$ in order to correct for the differential phase drifts in the interferometer signal channels 13. The ambiguity up to a multiple of $\pi$ radians is converted to an ambiguity to within a multiple of $2\pi$ radians in the initial external calibration of the interferometer 100.

By autocalibrating the system periodically, the phase drifts can be monitored so as to maintain the ambiguity in the determination at a multiple of $2\pi$ radians, rather than at a multiple of $\pi$ radians. Since the various elements of the interferometer 100 are selected to be relatively phase stable and since elements in the various signal paths are designed to assure tracking of uncontrollable variable phase shifts, the temporal variation in the differential phase shift between signal channels 13 is sufficiently slow that maintaining the resulting ambiguity in determination of the differential phase error, $A_L-A_R$, at an integral multiple of $2\pi$ radians poses no problem.

It should be noted that in the first interferometer 100, the secondary comparator 131 works at the frequency of the calibration source or frequency synthesizer 25, which corresponds to the antenna frequency range—which is RF. However, it is generally more practical and economical to use phase comparators at intermediate frequencies. This requires the addition of components, such as mixers and IF amplifiers in the transmission lines to the secondary comparator. These components can constitute additional sources of calibration error.

It is in accord with the present invention to replace the signals from the reversing switch outputs to the mixers in such a system by a common signal. When this replacement is in effect, the output of the secondary comparator reflects the difference in the phase shifts introduced by mixers and IF amplifiers leading to the two inputs of the secondary comparator. The second interferometer 200, however, accomplishes this additional calibration without an additional signal source.

In addition to the components of the first interferometer, the second interferometer 200 includes secondary mixers 65, secondary IF amplifiers 67, a secondary reversing switch 70 and a secondary switch controller 71. The outputs of the respective reversing switches 40 are the inputs to the secondary reversing switch 70. The outputs of the secondary reversing switch 70 are inputs to the secondary mixers 65. The mixing signals are provided conveniently by the local oscillator 23. The outputs of the secondary mixers 65 are the inputs of the secondary IF amplifiers 67, the outputs of which are inputs to the secondary comparator 231. The secondary comparator 231 is, in this interferometer autocalibration subsystem, an IF phase comparator.

The secondary switch controller 71 alternately places the secondary reversing switch 70 in first and second conditions. The effect is to commutate the signals from the respective reversing switches 40 between the secondary mixers 65. The output of the secondary comparator 231 averaged over the two secondary reversing switch conditions negates any differential contribution of the secondary mixers 65 and amplifiers 67 to phase delay. Hence, this average can be used in place of $\phi_{21}$ in the last equation written above to obtain the desired calibration data.

The autocalibration subsystem for the third interferometer 300, illustrated in FIG. 3 is designed for gain calibration. Such a system is useful where signals are combined additively to improve signal-to-noise ratio. Additional circuitry, such as that presented in the preceding embodiments, would also be included in a direction-finding interferometer.

Largely analogous to the phase calibration subsystem for the second interferometer 200, the gain calibration subsystem for the third interferometer 300 includes envelope detectors 381, preferably in series with logarithmic amplifiers 383, which precede the inputs to the two comparators 315, 331—in this case amplitude comparators or differential amplifiers. (The logarithmic amplifiers 383 eliminate the need for the secondary IF amplifiers 67 in the autocalibration subsystem for the second interferometer 200). Alternatively, the envelope detector 381 plus logarithmic amplifier 383 pairs could be replaced by logarithmic IF-to-video amplifiers.

Gain calibration is effected analogously with the second interferometer's phase calibration. The assumptions and equations are the same. The only difference is that the logarithmic amplitude gain differences are unambiguous, rather than ambiguous modulo $2\pi$.

In the third interferometer 300, gain calibration is conducted in an additive format (that is the gains are measured logarithmically) for which the analogy to the phase calibration embodiments is most clear. Alternatively, gain calibration could be conducted in a multiplicative format, with modifications well within the ken of one skilled in the art. In particular, such calibration could be effected digitally using the amplitudes of the inputs to amplitude comparators 315 and 331. In this case the amplitude comparison is done in data processing.

The drifts with which this invention is concerned are those that produce phase and gain difference variations between channels. Another source of potential error is mechanical deformation of the antennas, their support structures, gimbals, booms and in the incorporating aerospace structure itself relative to the attitude reference subsystem. Various types of sensors, predominantly electro-optical in nature, can be used to measure these mechanical deformations, so that the data can be corrected or the antenna pointing adjusted to compensate for the effects. The time constants for thermal distortion effects will usually be sufficiently long that, once these effects have been determined, they can be predicted and appropriate corrections made for them.

Generally, it is preferable to combine the use of the autocalibration systems described above with external calibration means. Furthermore, the external calibration can detect errors not within the capability of the internal calibration system.

In accordance with the above, the data necessary for frequent autocalibration of gain or phase are available at the outputs of the comparators. Compensation may take the form of nulling the drifts in question by means of feedback or feedforward loops. Alternatively, compensation may be effected "downstream" in a data processing subsystem.

It should be noted that the illustrative embodiments may be modified in a variety of ways. For example, additional or other components may be included in the signal channels for the antenna outputs. These do not affect the basic autocalibration operation. More complex systems with additional antennas and signal channels are contemplated. In such cases, one antenna might serve as a reference against which all the others are compared in the manner described herein. Alternatively, other comparison schemes are readily derived. Gain autocalibration may be effected in accordance with the present invention by analogy to the first phase autocalibration embodiment with a second comparator at RF frequencies rather than at IF frequencies. These and other embodiments and modifications are within the scope of the present invention.

What is claimed is:

1. An autocalibration subsystem for a direction-finding interferometer, said interferometer having first and second antennas, first and second signal channels, and a primary comparator for comparing signals according to a predetermined characteristic, said first signal channel being adapted for transmitting the output of said first antenna to said primary comparator, said second signal channel being adapted for transmitting the output of said second antenna to said primary comparator, said subsystem comprising:
   first and second reversing switches, each reversing switch means having an input port, an output port, a third port and a fourth port;
   a signal source for providing a calibrate signal to the input port of each of said reversing switches;
   a secondary comparator for comparing two signals according to said predetermined characteristic, said secondary comparator having first and second inputs, said first input of said secondary comparator being adapted for receiving a signal from said output port of said first reversing switch, said second input of said secondary comparator being adapted for receiving a signal from said output port of said second reversing switch, said secondary comparator being adapted for detecting the phase difference of signals received at its first and second inputs;

first and second couplers located adjacent respective said antennas, each coupler having first and second inputs and an output, each said coupler output serving as an input to the respective said signal channel, each said first input of each said coupler being electrically connected to the output of the respective said antenna, each said second input of each said coupler being electrically connected to said third port and said fourth port of the respective said reversing switch so that a signal path exists between respective third and fourth ports; and controller means for alternately providing first and second concurrent switch conditions in said reversing switches so that in said first condition each said input port is electrically connected to the respective said third port and each said output port is electrically connected to the respective said fourth port, and so that in said second condition each said input port is electrically connected to the respective said fourth port and each said output port is electrically connected to the respective said third port.

2. The subsystem of claim 1 wherein the predetermined characteristic is phase.

3. The subsystem of claim 1 wherein the predetermined characteristic is amplitude.

4. The subsystem of claim 1 further comprising:

first and second transform means for transforming the signal from the output port of the respective said reversing switch so as to be within the operational range of said secondary comparator, each said transform means being electrically located between the respective said reversing switch and the respective said input of said secondary comparator; and means for replacing the signals from said output ports with a common signal so that relative shifts in the predetermined signal characteristic introduced by the respective said tranform means can be measured.

5. The subsystem of claim 1 further comprising:

first and second signal transform means, said first signal transform means being electrically connected to said first input of said secondary comparator, said second signal transform means being electrically connected to said second input of said secondary comparator, each signal transform means having an input for receiving an output from one of said reversing switches; and means for commutating the outputs of said reversing switches between the inputs to said first and second signal transform means.

6. The subsystem of claim 5 wherein the determined characteristic is phase.

7. The subsystem of claim 5 wherein the determined characteristic is amplitude.

8. An autocalibration subsystem for a direction-finding interferometer, said interferometer having first and second antennas, first and second signal channels, and a primary comparator, said first signal channel being adapted for transmitting the output of said first antenna to said primary comparator, said second signal channel being adapted for transmitting the output of said second antenna to said comparator, said subsystem comprising:

first and second reversing switches, each reversing switch means having an input port, an output port, a third port and a fourth port;

a signal source for providing a calibrate signal to the input ports of said reversing switches;

controller means for alternately providing first and second concurrent switch conditions in said reversing switches, in said first condition each said input port is electrically connected to the respective said third port and each said output port is electrically connected to the respective said fourth port, in said second condition each said input port is electrically connected to the respective said fourth port and each said output port is electrically connected to the respective said third port;

first and second couplers located adjacent respective said antennas, each coupler having first and second inputs and an output, each said coupler output serving as an input to the respective said signal channel, each said first input of each said coupler being electrically connected to the output of the respective said antenna, each said second input of each said coupler being electrically connected to said third port and said fourth port of the respective said reversing switch so that a signal path exists between respective third and fourth ports;

first and second transform means for transforming a signal received so as to be within the operational range of said secondary comparator;

a second comparator having first and second inputs, said first input of said secondary comparator being adapted for receiving a signal from said first transform means, said second input of said secondary comparator being adapted for receiving a signal from second transform means, said second comparator being adapted for detecting the phase difference of signals received at its first and second inputs; and means for alternating between two switch conditions so that in said first condition the output of said first reversing switch is directed to said first transform means and the output of said second reversing switch is directed to said second transform means, and so that in said second condition the output of said first reversing switch is directed to said second transform means and the output of said second reversing switch is directed to said first transform means so that relative phase shifts introduced by the respective said transform means can be measured.

9. An autocalibration subsystem for a direction-finding interferometer, said interferometer having first and second antennas, first and second signal channels, and a primary comparator for comparing signals according to a predetermined characteristic, said first signal channel being adapted for transmitting the output of said first antenna to said primary comparator, said second signal channel being adapted for transmitting the output of said second antenna to said primary comparator, said subsystem comprising:

first and second reversing switches, each reversing switch means having an input port, and output port, a third port and a fourth port;

a signal source for providing a calibrate signal to the input port of each of said reversing switches;

a secondary comparator for comparing two signals according to said predetermined characteristic, said secondary comparator having first and second inputs, said first input of said secondary comparator being adapted for receiving a signal from said output port of said first reversing switch, said second input of said secondary comparator being adapted for receiving a signal from said output port of said second reversing switch, said secondary comparator being adapted for detecting the phase difference of signals received at its first and second inputs;

first and second couplers located adjacent respective said antennas, each coupler having first and second inputs and an output, each said coupler output serving as an input to the respective said signal channel, each said first input of each said coupler being electrically connected to the output of the respective said antenna, each said second input of each said coupler being electrically connected to said third port and said fourth port of the respective reversing switch so that a signal path exists between respective third and fourth ports;

controller means for alternately providing first and second concurrent switch conditions in said reversing switches so that in said first condition each said input port is electrically connected to the respective said third port and each said output port is electrically connected to the respective said fourth port, and so that in said second condition each said input port is electrically connected to the respective fourth port and each said output is electrically connected to the respective third port; and first and second transform means for transforming the signal from the output port of the respective reversing switch so as to be within the operational range of said secondary comparator, each said transform means being electrically located between the respective said reversing switch and the respective input of said secondary comparator; and means for replacing the signals from said output ports with a common signal so that relative shifts in the predetermined signal characteristic introduced by the respective transform means can be measured.

10. An autocalibration subsystem for a direction-finding interferometer, said interferometer having first and second antennas, first and second signal channels, and a primary comparator for comparing signals according to a predetermined characteristic, said first signal channel being adapted for transmitting the output of said first antenna to said primary comparator, said second signal channel being adapted for transmitting the output of said second antenna to said primary comparator, said subsystem comprising:

first and second reversing switches, each of the reversing switches means having an input port, and output port, a third port and a fourth port;

a signal source for providing a calibrate signal to the input port of each of said reversing switches;

a secondary comparator for comparing two signals according to said predetermined characteristic, said secondary comparator having first and second inputs, said first input of said secondary comparator being adapted for receiving a signal from said output port of said first reversing switch, said second input of said secondary comparator being adapted for receiving a signal from said output port of said second reversing switch, said secondary comparator being adapted for detecting the phase difference of signal received at its first and second inputs;

first and second couplers located adjacent respective said antennas, each coupler having first and second inputs and an output, each said coupler output serving as an input to the respective said signal channel, each said first input of each said coupler being electrically connected to the output of the respective said antenna, each said second input of each said coupler being electrically connected to said third port and said fourth port of the respective reversing switch so that a signal path exists between respective third and fourth ports;

controller means for alternately providing first and second concurrent switch conditions in said reversing switches so that in said first condition each said input port is electrically connected to the respective said third port and each said output port is electrically connected to the respective said fourth port, and so that in said second condition each said input port is electrically connected to the respective fourth port and each said output is electrically connected to the respective third port; and first and second signal transform means, said first signal transform means being electrically connected to said first input of said secondary comparator, said second signal transform means being electrically connected to said second input of said secondary comparator, each signal transform mean having an input for receiving an output from one of said reversing switches; and means for commutating the outputs of said reversing switches between the inputs to said first and second signal transform means.

11. The subsystem of claim 10 wherein the predetermined characteristic is phase.

12. The subsystem of claim 10 wherein the predetermined characteristic is amplitude.

* * * * *